United States Patent
Okuda et al.

(10) Patent No.: US 11,762,655 B2
(45) Date of Patent: Sep. 19, 2023

(54) VEHICLE CONTROL APPARATUS

(71) Applicant: TOYOTA JIDOSHA KABUSHIKI KAISHA, Toyota (JP)

(72) Inventors: Koichi Okuda, Toyota (JP); Atsushi Tabata, Okazaki (JP); Masafumi Yamamoto, Nagakute (JP); Yuuki Makino, Aichi-gun (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 66 days.

(21) Appl. No.: 17/590,859

(22) Filed: Feb. 2, 2022

(65) Prior Publication Data

US 2022/0253305 A1    Aug. 11, 2022

(30) Foreign Application Priority Data

Feb. 8, 2021   (JP) .................................. 2021-018574

(51) Int. Cl.
*G06F 8/65* (2018.01)
*B60W 50/00* (2006.01)
*B60S 5/00* (2006.01)

(52) U.S. Cl.
CPC .............. *G06F 8/66* (2013.01); *B60W 50/00* (2013.01); *B60S 5/00* (2013.01); *B60W 2050/0083* (2013.01); *B60W 2556/45* (2020.02)

(58) Field of Classification Search
CPC ..... G06F 8/66; B60W 50/00; B60W 2556/45; B60W 2050/0083; B60S 5/00
See application file for complete search history.

(56) References Cited

U.S. PATENT DOCUMENTS

| | | | |
|---|---|---|---|
| 2017/0278312 A1* | 9/2017 | Minster | G05D 1/0297 |
| 2018/0212822 A1* | 7/2018 | Ikeda | H04L 41/082 |
| 2019/0138296 A1* | 5/2019 | Ishikawa | G06F 11/1433 |

(Continued)

FOREIGN PATENT DOCUMENTS

| | | | | |
|---|---|---|---|---|
| JP | 2011-081604 A | | 4/2011 | |
| JP | 2019191742 A | * | 10/2019 | ........... B60R 16/023 |
| WO | WO-2018142749 A1 | * | 8/2018 | ............. B60R 16/02 |

OTHER PUBLICATIONS

Broy et al., "Engineering Automotive Software" (Year: 2007).*

*Primary Examiner* — Phillip H Nguyen
(74) *Attorney, Agent, or Firm* — Oblon, McClelland, Maier & Neustadt, L.L.P.

(57) ABSTRACT

A vehicle control apparatus including: a storage portion configured to store therein a vehicle control software for controlling a vehicle; a receiving portion configured to receive an update software from an external server; and an updating portion configured to update the vehicle control software stored in the storage portion, to the update software received by the receiving portion. The updating portion is configured to determine whether the vehicle is in a long-time requiring state that requires a long time for making a repair of the vehicle which is needed in case update of the vehicle control software is not successfully completed. The updating portion is configured to execute the update of the vehicle control software when determining that the vehicle is not in the long-time requiring state, and is configured to withhold the update of the vehicle control software when determining that the vehicle is in the long-time requiring state.

7 Claims, 4 Drawing Sheets

(56) References Cited

U.S. PATENT DOCUMENTS

2019/0138298 A1* 5/2019 Teraoka .................. G06F 9/445
2019/0286454 A1* 9/2019 Sano .................... B60R 16/0231
2021/0157578 A1* 5/2021 Lee ..................... G06F 12/0246

* cited by examiner

VEHICLE CONTROL APPARATUS

This application claims priority from Japanese Patent Application No. 2021-018574 filed on Feb. 8, 2021, the disclosure of which is herein incorporated by reference in its entirety.

FIELD OF THE INVENTION

The present invention relates to a vehicle control apparatus capable of updating a software for controlling a vehicle.

BACKGROUND OF THE INVENTION

There is known a vehicle control apparatus configured to receive an update software from an external server, and to update a stored software to the received update software. A vehicle-program update apparatus disclosed in JP-2011-81604A is an example of such a vehicle control apparatus. This Japanese Patent Application Publication discloses a vehicle control apparatus is configured to update the software, and to receive, from an external server, a risk information related to vehicle functions that become unavailable in case update of the software is not successfully completed, so that a vehicle driver can choose whether the update of the software is to be executed or withheld, based on the risk information.

SUMMARY OF THE INVENTION

By the way, in the vehicle-program update apparatus disclosed in the above-identified Japanese Patent Application Publication, the vehicle driver is required to make a choice as to whether the update of the software is to be executed or withheld, based on the risk information, so that the vehicle driver could feel cumbersome when required to make the choice.

The present invention was made in view of the background art described above. It is therefore an object of the present invention to provide a vehicle control apparatus capable of suppressing reduction of convenience for a vehicle driver in case update of a software is not successfully completed, without requiring the vehicle driver to make a cumbersome choice as to whether the update of the software is to be executed or withheld.

The object indicated above is achieved according to the following aspects of the present invention.

According to a first aspect of the invention, there is provided a vehicle control apparatus comprising: a storage portion configured to store therein a vehicle control software for controlling a vehicle; a receiving portion configured to receive an update software from an external server; and an updating portion configured to update the vehicle control software stored in the storage portion, to the update software received by the receiving portion, wherein the updating portion is configured to determine whether the vehicle is in a long-time requiring state that requires a long time for making a repair of the vehicle which is needed in case update of the vehicle control software is not successfully completed, and wherein the updating portion is configured to execute the update of the vehicle control software when determining that the vehicle is not in the long-time requiring state, and is configured to withhold the update of the vehicle control software when determining that the vehicle is in the long-time requiring state.

According to a preferred arrangement of the first aspect of the invention, the updating portion is configured to determine whether the vehicle is in a software-update requiring state that requires the update of the vehicle control software, or not, and to determine whether a content of the update of the vehicle control software influences a running performance of the vehicle, or not, wherein the updating portion is configured to execute the update of the vehicle control software, when determining that the vehicle is in the software-update requiring state, and/or that the content of the update of the vehicle control software does not influence the running performance of the vehicle, irrespective of whether determining that the vehicle is in the long-time requiring state or not.

According to a second aspect of the invention, in the vehicle control apparatus according to the first aspect of the invention, the updating portion is configured to determine whether the vehicle is in the long-time requiring state or not, depending on whether a required time, which is required to move the vehicle to a vehicle maintenance base for making the repair of the vehicle, is longer than a predetermined allowable time value or not, wherein the updating portion is configured to determine that the vehicle is in the long-time requiring state, when the required time is longer than the allowable time value.

According to a third aspect of the invention, in in the vehicle control apparatus according to the first aspect of the invention, the updating portion is configured to determine whether the vehicle is in the long-time requiring state or not, depending on whether a distance from a current location of the vehicle to a vehicle maintenance base for making the repair of the vehicle, is longer than a predetermined allowable distance value or not, wherein the updating portion is configured to determine that the vehicle is in the long-time requiring state, when the distance is longer than the allowable distance value.

According to a fourth aspect of the invention, in in the vehicle control apparatus according to the first aspect of the invention, the updating portion is configured, when a maintenance personnel is available for making the repair of the vehicle, to determine whether the vehicle is in the long-time requiring state or not, depending on whether a required time, which is required for the maintenance personnel to arrive in a current location of the vehicle, is longer than a predetermined allowable time value or not, wherein the updating portion is configured to determine that the vehicle is in the long-time requiring state, when the required time is longer than the allowable time value.

According to a fifth aspect of the invention, in in the vehicle control apparatus according to any one of the first through fourth aspects of the invention, the updating portion is configured to determine whether the vehicle is in a software-update requiring state that requires the update of the vehicle control software, or not, wherein, when determining that the vehicle is in the software-update requiring state, the updating portion is configured to execute the update of the vehicle control software.

According to a sixth aspect of the invention, in in the vehicle control apparatus according to any one of the first through fifth aspects of the invention, the updating portion is configured to determine whether a content of the update of the vehicle control software influences a running performance of the vehicle, or not, wherein, when determining that the content of the update of the vehicle control software does not influence the running performance of the vehicle, the updating portion is configured to execute the update of the vehicle control software.

In the vehicle control apparatus according to the first aspect of the invention, it is determined whether the vehicle is in the long-time requiring state that requires a long time for making the repair of the vehicle which is needed in case the update of the vehicle control software is not successfully completed, such that the update of the vehicle control software is executed when it is determined that the vehicle is not in the long-time requiring state, and such that the update of the vehicle control software is withheld when it is determined that the vehicle is in the long-time requiring state. This control arrangement makes it possible to suppress reduction of convenience for a vehicle driver in case the update of the vehicle control software is not successfully completed, without making the vehicle driver feel cumbersome.

In the vehicle control apparatus according to the second aspect of the invention, it can be determined whether the vehicle is in the long-time requiring state (that requires a long time for making the repair of the vehicle) or not, by calculating the required time that is required to move the vehicle to the vehicle maintenance base.

In the vehicle control apparatus according to the third aspect of the invention, it can be determined whether the vehicle is in the long-time requiring state (that requires a long time for making the repair of the vehicle) or not, by calculating the distance from the current location of the vehicle to the vehicle maintenance base.

In the vehicle control apparatus according to the fourth aspect of the invention, it can be determined whether the vehicle is in the long-time requiring state (that requires a long time for making the repair of the vehicle) or not, by calculating the required time that is required for the maintenance personnel to arrive in the current location of the vehicle.

In the vehicle control apparatus according to the fifth aspect of the invention, when the vehicle is in the software-update requiring state that requires the update of the vehicle control software, the update of the vehicle control software is executed thereby increasing a possibility that the vehicle could be returned to a normal condition and accordingly improving the convenience for the vehicle driver.

In the vehicle control apparatus according to the sixth aspect of the invention, when the content of the update of the vehicle control software does not influence the running performance of the vehicle, the vehicle can continue running even in case the update of the vehicle control software is not successfully completed. In such a case in which the normal running of the vehicle can be made even in case the update of the vehicle control software is not successfully completed, the update of the vehicle control software is executed.

DETAILED DESCRIPTION OF PREFERRED EMBODIMENT

Hereinafter, preferred embodiment of the invention will be described in detail with reference to the accompanying drawings. The figures of the drawings are simplified or deformed as needed, and each portion is not necessarily precisely depicted in terms of dimension ratio, shape, etc.

Embodiment

Figure 1:
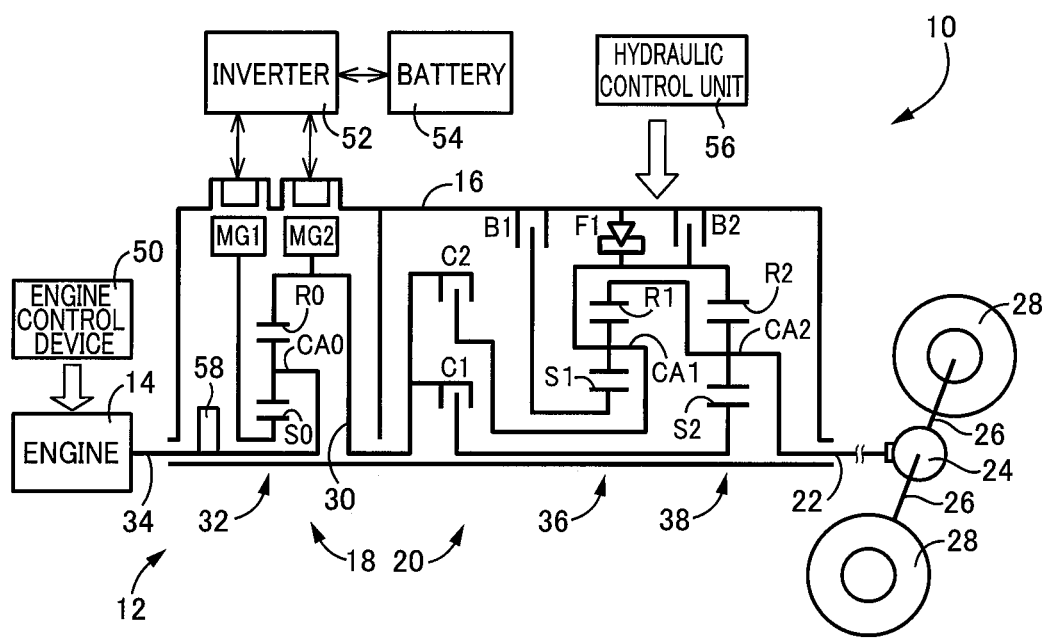
FIG. 1 is a schematic view showing a construction of a vehicle to which the present invention is applied.

FIG. 1 is a schematic view showing a construction of a vehicle 10 to which the present invention is applied. The vehicle 10 includes an engine 14, a first rotating machine MG1 and a second rotating machine MG2, and is a hybrid electric vehicle in which the engine 14 and the second rotating machine MG2 serve as drive power sources for driving the vehicle 10. The vehicle 10 further includes a power transmission apparatus 12 that constitutes a drive-power transmission path between the engine 14 and drive wheels 28. The power transmission apparatus 12 includes a casing 16 as a non-rotary member, an electrically-operated continuously-variable transmission portion 18 and a mechanically-operated step-variable transmission portion 20. The continuously-variable transmission portion 18 and the step-variable transmission portion 20 are provided within the casing 16, and are arranged in a series on a common axis. The continuously-variable transmission portion 18 is connected to the engine 14 directly or indirectly through, for example, a damper (not shown). The step-variable transmission portion 20 is connected to an output rotary member of the continuously-variable transmission portion 18. The power transmission apparatus 12 further includes a differential gear device 24 connected to an output shaft 22 that is an output rotary member of the step-variable transmission portion 20, and a pair of axles 26 connected to the differential gear device 24.

In the power transmission apparatus 12, the drive power outputted from the engine 14 or the second rotating machine MG2 is transmitted to the step-variable transmission portion 20, and is then transmitted from the step-variable transmission portion 20 to the drive wheels 28 of the vehicle 10, for example, through the differential gear device 24. It is noted that the power corresponds to a torque or a force unless otherwise distinguished from them. It is also noted that the power transmission apparatus 12 including the continuously-variable transmission portion 18 and the step-variable transmission portion 20 is constructed substantially symmetrically about its axis corresponding to the above-described common axis, so that a lower half of the power transmission apparatus 12 is not shown in FIG. 1.

The engine 14 serves as the drive power source capable of generating a drive torque, and is a known internal combustion engine such as gasoline engine and diesel engine. The vehicle 10 is provided with an engine control device 50 that includes a throttle actuator, a fuel injection device and an ignition device. With the engine control device 50 being controlled, an engine torque Te, which is an output torque of the engine 14, is controlled.

Each of the first and second rotating machines MG1, MG2 is a rotating electric machine having a function serving as an electric motor and a function serving as a generator. That is, each of the first and second rotating machines MG1, MG2 is a so-called "motor generator". The first and second rotating machines MG1, MG2 are connected to an electric storage device in the form of a battery 54 provided in the vehicle 10, through an inverter 52 provided in the vehicle 10. The inverter 52 is controlled by a running control device 90 whereby an MG1 torque Tg and an MG2 torque Tm as output torques of the respective first and second rotating machines MG1, MG2 are controlled.

The continuously-variable transmission portion 18 is provided with: the above-described first rotating machine (first motor/generator) MG1; a differential mechanism 32 serving as a drive-force distributing device to mechanically distribute the drive force of the engine 14 to the first rotating machine MG1 and to an intermediate transmission member 30 that is an output rotary member of the continuously-variable transmission portion 18; and a second rotating machine (second motor/generator) MG2 connected to the intermediate transmission member 30 in a drive-force transmittable manner. The differential mechanism 32 is constituted by a planetary gear device of a single-pinion type having a sun gear 50, a carrier CAO and a ring gear RO. The carrier CAO is connected to the engine 14 through a connecting shaft 34 in a drive-force transmittable manner, and the sun gear 50 is connected to the first rotating machine MG1 in a drive-force transmittable manner, while the ring gear RO is connected to the second rotating machine MG2 in a drive-force transmittable manner. The continuously-variable transmission portion 18 is an electrically-controlled continuously-variable transmission wherein a differential state of the differential mechanism 32 is controllable by controlling an operation state of the first rotating machine MG1. It is noted that the connecting shaft 34 is connected to a mechanically-operated oil pump 58 that is to be driven by the power of the engine 14.

The step-variable transmission portion 20 is a mechanically-operated transmission mechanism which constitutes a part of a drive-power transmitting path between the continuously-variable transmission portion 18 and the drive wheels 28. The step-variable transmission portion 20 is a known automatic transmission of a planetary gear type which is provided with a plurality of planetary gear devices in the form of a first planetary gear device 36 and a second planetary gear device 38, and a plurality of engagement devices including a clutch C1, a clutch C2, a brake B1 and a brake B2. Hereinafter, the clutch C1, clutch C2, brake B1 and brake B2 will be referred to as "engagement devices CB" unless otherwise specified. Each of the engagement devices CB receives an engagement hydraulic pressure PRcb that is controlled by a hydraulic control unit (hydraulic control circuit) 56 provided in the vehicle 10. When a gear position is selected, based on an accelerator operation amount (accelerator opening degree θacc) and a running speed V of the vehicle 10, for example, so as to be established in the step-variable transmission portion 20, operation states of the respective engagement devices CB are controlled such that corresponding at least one of the engagement devices CB is engaged for establishing the selected gear position. It is noted that the hydraulic control unit 56 is configured to receive a working fluid supplied from the mechanically-operated oil pump 58 or supplied from an electrically-operated oil pump (not shown).

Figure 2:
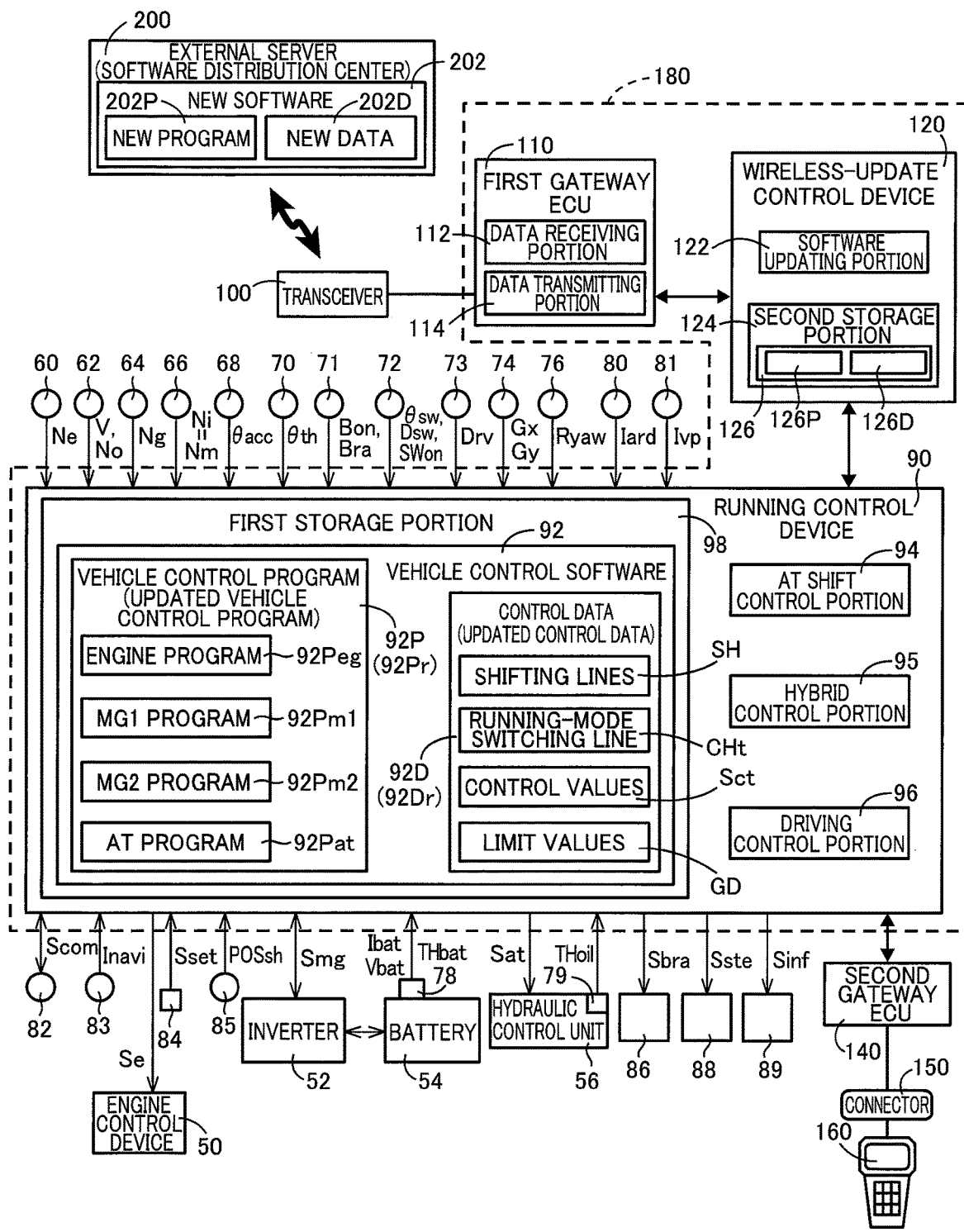
FIG. 2 is a schematic view showing a construction of a system for executing various control operations in the vehicle shown in FIG. 1.

FIG. 2 is a schematic view showing a construction of a system for executing various control operations in the vehicle shown in FIG. 1. The vehicle 10 is provided with the running control device 90 configured to execute mainly the various control operations related to running of the vehicle 10. For example, the running control device 90 includes a so-called microcomputer incorporating a CPU, a ROM, a RANI and an input-output interface. The CPU performs control operations of the vehicle 10, by processing various input signals, according to control programs stored in the ROM, while utilizing a temporary data storage function of the RAM. The running control device 90 may be constituted by two or more control units exclusively assigned to perform respective control operations such as a control operation for controlling the drive power sources and a control operation for controlling the step-variable transmission.

The running control device 90 receives various input signals based on values detected by respective sensors provided in the vehicle 10. Specifically, the running control device 90 receives: an output signal of an engine speed sensor 60 indicative of the engine rotational speed Ne; an output signal of an output speed sensor 62 indicative of the output rotational speed No which is the rotational speed of the output shaft 22 and corresponds to the running speed V of the vehicle 10; an output signal of a MG1 speed sensor 64 indicative of an MG1 rotational speed Ng which is a rotational speed of the first rotating machine MG1; an output signal of a MG2 speed sensor 66 indicative of the MG2 rotational speed Nm which is the rotational speed of the second rotating machine MG2 and which corresponds to the AT input rotational speed Ni; an output signal of an accelerator-opening degree sensor 68 indicative of an accelerator opening degree θacc representing an amount of accelerating operation made by the vehicle driver; an output signal of a throttle-opening degree sensor 70 indicative of a throttle opening degree θth; an output signal of a brake pedal sensor 71 indicative of a brake-ON signal Bon representing a state of depression of a brake pedal by the vehicle driver to operate wheel brakes and also a braking operation amount Bra representing an amount of depression of the brake pedal by the vehicle driver; an output signal of a steering sensor 72 indicative of a steering angle θsw and a steering direction Dsw of a steering wheel provided in the vehicle 10 and also a steering ON signal SWon representing a state in which the steering wheel is being held by the vehicle driver; an output signal of a driver condition sensor 73 indicative of a driver condition signal Dry representing a condition of the vehicle driver; an output signal of a G senor 74 indicative of a longitudinal acceleration Gx and a lateral acceleration Gy of the vehicle 10; an output signal of a yaw rate sensor 76 indicative of a yaw rate Ryaw that is an angular speed around a vertical axis of the vehicle 10; an output signal of a battery sensor 78 indicative of a battery temperature THba, a charging/discharging electric current Ibat and a voltage Vbat of the battery 54; an output signal of a fluid temperature sensor 79 indicative of a working fluid temperature THoil that is a temperature of the working fluid OIL; an output signal of a vehicle-area information sensor 80 indicative of vehicle area information Iard; an output signal of a vehicle location sensor 81 indicative of location information Ivp; an output signal of an external-network communication antenna 82 indicative of an communication signal Scom; an output signal of a navigation system 83 indicative of navigation information Inavi; output signals of drive-assist setting switches 84 indicative of drive-assist setting signals Sset representing a setting made by the vehicle driver for execution of a drive-assist control such as automatic drive control and a cruise control; and an output signal of a shift position sensor 85 indicative of an operation position POSsh of a shift lever provided in the vehicle 10.

The running control device 90 generates various output signals to the various devices provided in the vehicle 10, such as: an engine control command signal Se that is to be supplied to the engine control device 50 for controlling the engine 14, rotating-machine control command signals Smg that are to be supplied to the inverter 52 for controlling the first and second rotating machines MG1, MG2; hydraulic control command signal Sat that is to be supplied to the hydraulic control unit 56 for controlling the operation states of the engagement devices CB; the communication signal Scorn that is to be supplied to the external-network communication antenna 82; a brake-control command signal Sbra that is supplied to a wheel brake device 86, for controlling a braking torque generated by the wheel brake device 86; a steering-control command signal Sste that is to be supplied to a steering device 88, for controlling steering of wheels (especially, front wheels) of the vehicle 10; and an information-notification-control command signal Sinf that is to be supplied to an information notification device 89, for warning and notifying information to the vehicle driver.

For performing various control operations in the vehicle 10, the running control device 90 further includes an AT shift control means in the form of an AT shift control portion 94, a hybrid control means in the form of a hybrid control portion 95, and a driving control means in the form of a driving control portion 96.

The AT shift control portion 94 is configured to determine whether a shifting action is to be executed or not in the step-variable transmission portion 20, by using, for example, an AT-gear-position shifting map (not shown), which is a relationship obtained by experimentation or determined by an appropriate design theory, and to execute a shift control operation in the step-variable transmission portion 20 as needed. The AT-gear-position shifting map represents a predetermined relationship between two variables in the form of the vehicle running speed V and the required drive force Frdem, for example, wherein the relationship is used in the shift control operation executed in the step-variable transmission portion 20, and wherein the AT-gear-position shifting map contains a plurality of shifting lines in two-dimensional coordinates in which the running speed V and the required drive force Frdem are taken along respective two axes. The shifting lines are used to determine whether the shifting action is to be executed in the step-variable transmission portion 20, namely, whether a currently established one of the AT gear positions is to be switched to another one of the AT gear positions.

The hybrid control portion 95 has a function serving as an engine control means or portion for controlling the operation of the engine 14 and a function serving as a rotating machine control means or portion for controlling the operations of the first rotating machine MG1 and the second rotating machine MG2 via the inverter 52, and executes a hybrid drive control, for example, using the engine 14, the first rotating machine MG1 and the second rotating machine MG2 through these control functions. The hybrid control portion 95 calculates a drive request amount in the form of the required drive force Frdem [N] that is to be applied to the drive wheels 28, by applying the accelerator opening degree θacc and the vehicle running speed V to, for example, a drive request amount map that is a predetermined relationship. The required drive torque Trdem [Nm] applied to the drive wheels 28, a required drive power Prdem [W] applied to the drive wheels 28 or a required AT output torque applied to the output shaft 22, for example, can be used as the drive request amount, in addition to the required drive force Frdem [N].

For example, when the continuously variable transmission portion 18 is operated as a continuously variable transmission, the hybrid control portion 95 controls the engine 14 and controls the generated electric power Wg of the first rotating machine MG1 so as to attain the engine rotational speed Ne and the engine torque Te at which the engine power Pe achieving the required drive power Prdem is acquired in consideration of an optimum engine operation point, for example, and thereby provides the continuously variable shift control of the continuously variable transmission portion 18 to change the gear ratio γ0 of the continuously variable transmission portion 18.

The hybrid control portion 95 selectively establishes a motor running mode or a hybrid running mode as the running mode depending on a driving state, so as to cause the vehicle 10 to run in a selected one of the running modes. For example, the hybrid control portion 95 selects and establishes the motor running mode when the required drive power Prdem is in an motor running region that is smaller than a threshold value, and selects and establishes the hybrid running mode when the required drive power Prdem is in a hybrid running region that is not smaller than the threshold value.

The driving control portion 96 is capable of executing, as a drive control for driving the vehicle 10, a selected one of a manual drive control for driving the vehicle 10 in accordance with driving operations made by the vehicle driver and an automatic drive control for automatically driving the vehicle 10 without depending on the driving operations executed by the vehicle driver. In the automatic drive control, for example, the vehicle 10 is accelerated, decelerated, braked and steered, depending on a target driving state that is automatically determined based on, for example, a map information and a destination point inputted by the vehicle driver. When an automatic drive mode is selected with an automatic-drive selecting switch of the drive-assist setting switches 84 being placed in ON by the vehicle driver, the driving control portion 96 establishes the automatic drive mode so as to execute the automatic drive control.

The vehicle 10 further includes a transceiver 100, a first gateway ECU 110, a wireless-update control device 120, a second gateway ECU 140 and a connector 150.

The transceiver 100 is a device configured to communicate with an external server 200 as an external device which is present apart from the vehicle 10 and is provided outside the vehicle 10. The transceiver 100 is connected to the external server 200 through a wireless communication.

The first gateway ECU 110 is connected to the transceiver 100. The first gateway ECU 110 functionally includes a data receiving portion 112 and a data transmitting portion 114. The data receiving portion 112 is configured to receive a plurality of kinds of new softwares 202, as needed, by using the transceiver 100, wherein the new softwares 202 are to be transmitted from the external server 200 through the wireless communication. The data transmitting portion 114 is configured to transmit the received new softwares 202 to the wireless-update control device 120. It is noted that the data receiving portion 112 corresponds to "receiving portion" recited in the appended claims.

The wireless-update control device 120 is a control device configured to control updates of a plurality of kinds of vehicle control softwares 92 in the vehicle 10. Specifically, the wireless-update control device 120 updates (rewrites) some or all of the plurality of kinds of vehicle control softwares 92 that are stored in the first storage portion 98, by using the plurality of kinds of new softwares 202 transmitted from the first gateway ECU 110.

Each of the first gateway ECU 110 and the wireless-update control device 120 has substantially the same hardware construction as the running control device 90. Each of the first gateway ECU 110 and the wireless-update control device 120 is configured to receive the new softwares 202 through the wireless communication, for example, from the external server 200 as the external device provided outside the vehicle 10, and to execute the updates (rewritings) of the vehicle control softwares 92 stored in the first storage portion 98 (e.g., ROM) that is provided in the running control device 90, by using the received new softwares 202. The vehicle control softwares 92 are softwares that are to be used in a plurality of kinds of controls executed by the running control device 90 in the vehicle 10. That is, the running control device 90 is configured to rewrite the vehicle control softwares 92, as needed, which are stored in the first storage portion 98 for controlling the vehicle 10. The vehicle control softwares 92 include a plurality of kinds of vehicle control programs 92P that define control procedures in the vehicle 10, and a plurality of kinds of control data 92D that are to be used when the vehicle 10 is controlled in accordance with the vehicle control programs 92P. It is noted that the first storage portion 98 corresponds to "storage portion" recited in the appended claims. It is also noted that the above-described running control device 90, first gateway ECU 110 and wireless-update control device 120 cooperate to constitute a vehicle control apparatus 180.

The second gateway ECU 140 also has substantially the same hardware construction as the running control device 90. The second gateway ECU 140 is connected to an external rewriting device 160 via the connector 150, and is configured to rewrite the plurality of kinds of vehicle control softwares 92 by using the external rewriting device 160. Although the vehicle 10 and the external rewriting device 160 are connected to each other via the connector 150 through a wire communication, they may be connected to each other through a wire-less communication.

The connector 150 is provided to enable the external rewriting device 160 to be connected to the vehicle 10, wherein the external rewriting device 160 is the external device that is provided outside the vehicle 10. A shape of the connector 150 and an electrical signal that is to be transmitted through the connector 150 are defined or determined by a known standard. The connector 150 can be used also as a connector through which a failure diagnostic device is connected to the vehicle 10.

The external rewriting device 160 is to be connected directly to an in-vehicle network of the vehicle 10, so that the external rewriting device 160 as well as the running control device 90, for example, can receive CAN (Controller Area Network) frame through the in-vehicle network and transmit the CAN frame to the in-vehicle network.

The external server 200 is a system connected to a network that is provided outside the vehicle 10. The external server 200 is configured to store therein the new softwares 202 uploaded thereto, and to transmit the new softwares 202 to the vehicle 10 as needed. The external server 200 serves as a software distribution center for distributing the new softwares 202. The new softwares 202 are softwares to which the current vehicle control softwares 92 are to be updated. That is, the new softwares 202 are to become updated vehicle control softwares 92 after the current vehicle control softwares 92 are updated to the new softwares 202, namely, after the current vehicle control softwares 92 are rewritten to the new softwares 202. The new softwares 202 include a plurality of kinds of new programs 202P to each of which a corresponding one of the vehicle control programs 92P is to be updated (rewritten), and also a plurality of kinds of new data 202D to each of which a corresponding one of the control data 92D is to be updated (rewritten). Each of the new programs 202P is to become an updated vehicle control program 92Pr after the corresponding current vehicle control program 92P is updated to the new program 202P, namely, after the corresponding current vehicle control program 92P is rewritten to the new program 202P. Each of the new data 202D is to become an updated control data 92Dr after the corresponding current control data 92D is updated to the new data 202D, namely, after the corresponding current control data 92D is rewritten to the new data 202D.

For performing function of updating the plurality of kinds of vehicle control softwares 92, the wireless-update control device 120 includes a software updating means in the form of a software updating portion 122 and a second storage portion 124 such as a rewritable ROM. It is noted that the software updating portion 122 corresponds to "updating portion" recited in the appended claims.

The software updating portion 122 is configured to determine whether at least one of the new softwares 202, which is not stored in the second storage portion 124 and which is to be transmitted to the vehicle 10, is present in the external server 200, or not. When determining that at least one of the new softwares 202 that is to be supplied to the vehicle 10 is present in the external server 200, the software updating portion 122 supplies, to the first gateway ECU 110, a command requesting the first gateway ECU 110 to receive the at least one of the new softwares 202 from the external server 200 through the wireless communication, namely, to download the at least one of the new softwares 202. Then, the software updating portion 122 causes each of the at least one of the new softwares 202 received by the first gateway ECU 110 from the external server 200, to be stored as an update software 126 in the second storage portion 124. The update software 126 is the new software 202 stored in the second storage portion 124. The update software 126 includes an update program 126P that is the new program 202P stored in the second storage portion 124, and also an update data 126D that is the new data 202D stored in the second storage portion 124.

The software updating portion 122 is configured to determine whether the new software 202, i.e., update software 126, into which the vehicle control software 92 needs to be rewritten, is present in the second storage portion 124 of the wireless-update control device 120, or not. When determining that the update software 126, into which the vehicle control software 92 (including the vehicle control program 92P and the control data 92D) needs to be rewritten, is present in the second storage portion 124, the software updating portion 122 updates the vehicle control software 92 (that is to be subjected to the rewriting or update) to the update software 126 that is present (stored) in the second storage portion 124.

The vehicle control program 92P includes, for example, an engine program 92Peg that is an engine control program to be used for controlling the engine 14 by the hybrid control portion 95, an MG1 program 92Pm1 that is a first-rotating-machine control program to be used for controlling the first rotating machine MG1 by the hybrid control portion 95, an MG2 program 92Pm2 that is a second-rotating-machine control program to be used for controlling the second rotating machine MG2 by the hybrid control portion 95, and an AT program 92Pat that is an automatic-transmission control program to be used for controlling the step-variable transmission portion 20 by the AT shift control portion 94.

The control data 92D includes a plurality of kinds of shifting lines SH (that are used for determining whether a shifting action is to be executed or not in the step-variable transmission portion 20), a running-mode switching line CHt (that is used for determining whether the running mode is to be switched from one of the motor running mode and the hybrid running mode to another), control values Sct (used for controlling the vehicle 10), and limit values GD for limiting correction values or amounts which are obtained through learning control and by which the respective control values Sct are to be corrected. The control values Sct are various command values based on, for example, the above-described engine control command signal Se, rotating-machine control command signals Smg, hydraulic control command signal Sat, brake-control command signal Sbra and steering-control command signal Sste. The control values Sct include an engaging-pressure command value as the hydraulic control command signal Sat in accordance with which the engaging pressure of the engagement device CB, whose operation state is switched in process of a shifting action executed in the step-variable transmission portion 20 by the AT shift control portion 94, is controlled to be changed. The AT shift control portion 94 corrects the engaging-pressure command value through the learning control, for example, such that the shifting action can be completed in the step-variable transmission portion 20 within an appropriate length of time, with a shifting shock being suppressed. The limit values GD are guard values provided for the respective various control values Sct, for example, such that each of the control values Sct is not changed excessively by the learning control.

As described above, when the vehicle control software 92 is required to be updated, the software updating portion 122 executes processing for updating the vehicle control software 92 by using the update software 126. However, the update of the vehicle control software 92 is not necessarily executed successfully by some reasons. When the update of the vehicle control software 92 is not completed successfully, if the vehicle 10 becomes difficult to be returned to normal by the vehicle operator, the vehicle 10 would have to be moved to a vehicle maintenance base BS by a towing vehicle, for example. That is, in such a case, a convenience for the vehicle driver could be problematically reduced. In view of such a problem, there is proposed an arrangement that enables to make a choice as to whether the update of the vehicle control software 92 is to be executed or withheld, prior to the execution of the updates of the vehicle control software 92, so that the vehicle driver makes the choice with reference to a risk information related to vehicle functions that become unavailable in case the update of the vehicle control software 92 is not successfully completed, wherein the risk information is transmitted in advance so as to be available to the vehicle driver. However, in this arrangement, the vehicle driver is required to make the choice as to whether the update of the vehicle control software 92 is to be executed or withheld, so that the vehicle driver could feel cumbersome when required to make the choice.

In the present embodiment, when the vehicle control software 92 is required to be updated, the software updating portion 122 has a control function for making a determination as to whether the update of the vehicle control software 92 is to be executed or not. The software updating portion 122 makes this determination depending on, for example, (i) a state of the vehicle 10, (ii) a content of the update of the vehicle control software 92, (iii) whether the content of the update of the vehicle control software 92 influences a running performance of the vehicle 10 or not, and (iv) whether the convenience for the vehicle driver would be largely reduced in case the update of the vehicle control software 92 is not successfully completed.

The software updating portion 122 determines whether the vehicle 10 is in a state in which a need for the update of the vehicle control software 92 is low or not, and determines that the update should not be executed when the vehicle 10 is in the state in which the need for the update of the vehicle control software 92 is low. In a case in which some functions of the vehicle 10 are impaired and the functions could be returned to normal by the update of the vehicle control software 92, it is regarded that the vehicle 10 is not in the state in which the need for the update of the vehicle control software 92 is low, so that the software updating portion 122 determines that the vehicle 10 is in a state in which the update of the vehicle control software 92 is needed, and executes the update of the vehicle control software 92.

The software updating portion 122 determines whether the content of the update of the vehicle control software 92 is a content whose need is low or not, namely, whether the need for the update of the vehicle control software 92 is determined to be low or not in view of the content of the update. The software updating portion 122 determines that the update should not be executed when determining that the need for the update of the vehicle control software 92 is low. The software updating portion 122 determines the need for the update by taking account of, for example, information accompanying the content of the update and indicator of the need for the update, and determines that the update should not be executed when determining that the need for the update is low. Specifically, the software updating portion 122 determines that the update of the vehicle control software 92 should not be executed, when determining that the content of the update of the vehicle control software 92 improves merely amenity in the vehicle 10, by taking account of the information accompanying the content of update, or when determining that a frequency of use of the vehicle control software 92 (that is to be updated), by taking account of a driving history of the vehicle driver, for example.

Further, the software updating portion 122 determines whether the content of the update of the vehicle control software 92 influences the running performance of the vehicle 10 or not. When determining that the content of the update influences the running performance of the vehicle 10, the software updating portion 122 determines that the update should not be executed. Specifically, for example, when the vehicle control software 92 related to the engine 14 or the step-variable transmission portion 20 is to be updated, namely, when the vehicle 10 could become difficult to run in case the update of the vehicle control software 92 is not completed successfully, the software updating portion 122 determines that the content of the update influences the running performance of the vehicle 10 and determines that the update should not be executed. On the other hand, for example, when the vehicle control software 92 related to an audio device of the vehicle 10 is to be updated, namely, when the vehicle 10 could run at least for a while even in case the update of the vehicle control software 92 is not completed successfully, the software updating portion 122 executes the update of the vehicle control software 92.

Further, the software updating portion 122 determines whether the update of the vehicle control software 92 should be executed or not, depending on whether the convenience for the vehicle driver would be largely reduced in case the update of the vehicle control software 92 is not successfully completed. Specifically, the software updating portion 122 determines whether the vehicle 10 is in a long-time requiring state that requires a long time for making a repair of the vehicle 10 which would be needed in case the update of the vehicle control software 92 is not successfully completed, wherein the long-time requiring state may be defined as a state in which a required time Tre, which is required for the repair of the vehicle 10, is long. When determining that the vehicle 10 is not in the long-time requiring state, the software updating portion 122 determines that the update of the vehicle control software 92 may be executed. When determining that the vehicle 10 is in the long-time requiring state, the software updating portion 122 determines that the update of the vehicle control software 92 should not be executed. The above-described repair of the vehicle 10 is, for example, restoration of the vehicle control software 92 or replacement of the vehicle control apparatus 180.

The above-described required time Tre includes a time required to move the vehicle 10 from a current location to the vehicle maintenance base BS so as to place the vehicle 10 into a state in which the repair can be made for the vehicle 10. The vehicle maintenance base BS corresponds to, for example, a vehicle dealer and a vehicle maintenance shop. The time required to move the vehicle 10 from a current location to the vehicle maintenance base BS is increased proportionally with increase of a distance L from the current location of the vehicle 10 to the vehicle maintenance base BS. That is, the longer the distance L from the current location of the vehicle 10 to the vehicle maintenance base BS, the longer the required time Tre required for the repair of the vehicle 10.

The software updating portion 122 is configured to determine whether the vehicle 10 is in the long-time requiring state in which the required time Tre required for the repair of the vehicle 10 is long, or not, depending on the distance L that is a value related to the required time Tre, more specifically, depending on whether the distance L from the current location of the vehicle 10 to the vehicle maintenance base BS is longer than an allowable distance value Lcri that is a predetermined threshold value, or not. When the distance L is longer than the allowable distance value Lcri, the software updating portion 122 determines that the vehicle 10 is in the long-time requiring state in which the required time Tre required for the repair of the vehicle 10 is long, and determines that the update of the vehicle control software 92 should not be executed. On the other hand, when the distance L is not longer than the allowable distance value Lcri, the software updating portion 122 determines that the vehicle 10 is not in the long-time requiring state in which the required time Tre required for the repair of the vehicle 10 is long, and determines that the update of the vehicle control software 92 may be executed. The allowable distance value Lcri is a predetermined value, which is obtained by experimentation or determined by an appropriate design theory, by taking account of, for example, a time required for moving the vehicle 10 by a distance corresponding to the allowable distance value Lcri.

When the vehicle 10 could be difficult to run by itself in case the update of the vehicle control software 92 is not successfully completed, the vehicle 10 would be required to be moved to the vehicle maintenance base BS by a towing vehicle or the like, so that a distance, by which the towing vehicle or the like is to be moved to the current location of the vehicle 10, is also taken into account in terms of the distance L. Further, when the vehicle 10 can run by itself in a limited condition, for example, with a limitation on the running speed V and/or the gear position being limited to a low-speed gear position, the allowable distance value Lcri may be changed by taking account of the limited condition. For example, the allowable distance value Lcri is set to a value that is further reduced as the running of the vehicle 10 is further limited.

Figure 3:
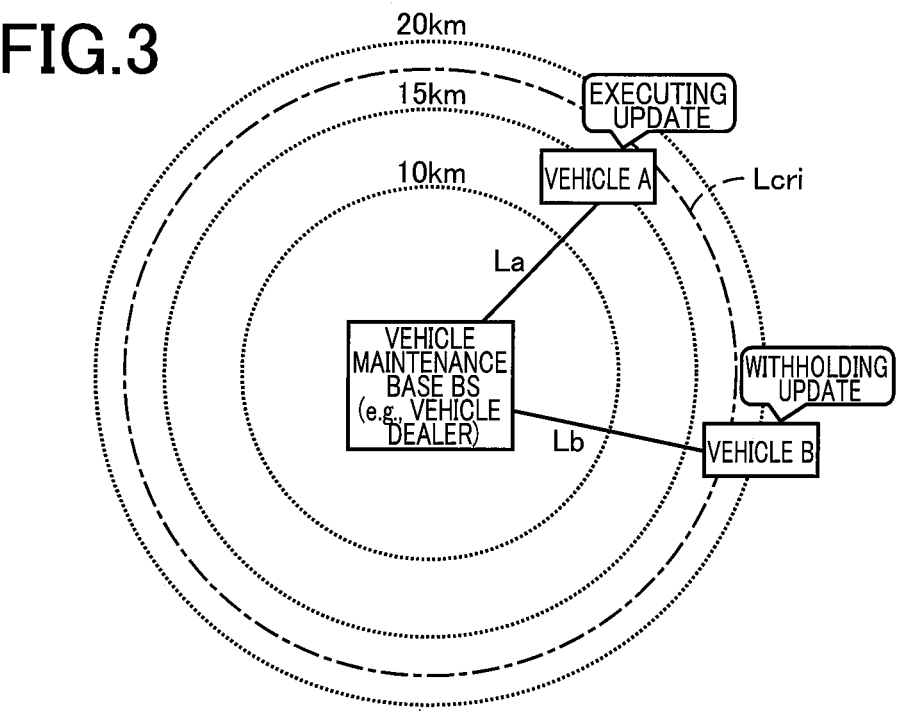
FIG. 3 is a view showing, by way of example, a concept of determination as to whether update of a vehicle control software is to be executed or withheld, depending on a distance from a current location of the vehicle to a vehicle maintenance base, wherein the distance represents a straight distance between the current location of the vehicle and the vehicle maintenance base.
Figure 4:
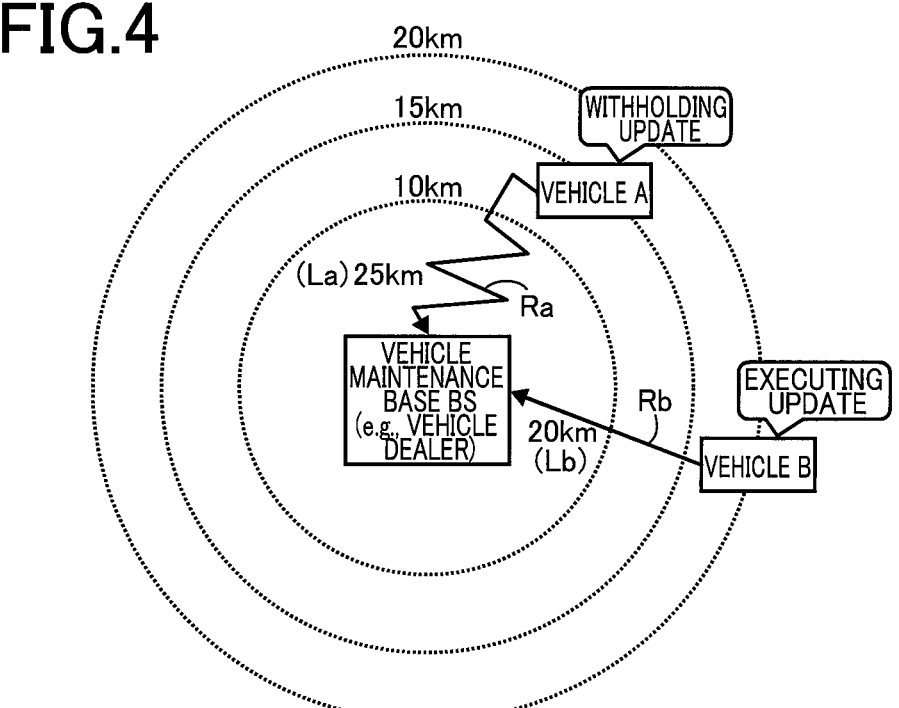
FIG. 4 is a view showing, by way of another example, the concept of determination as to whether the update of the vehicle control software is to be executed or withheld, depending on the distance from the current location of the vehicle to the vehicle maintenance base, wherein the distance represents a distance of a driving route from the current location of the vehicle to the vehicle maintenance base.

Each of FIGS. 3 and 4 is a view showing a concept of the determination as to whether the update of the vehicle control software 92 is to be executed or withheld, depending on the distance L from the current location of the vehicle 10 to the vehicle maintenance base BS. FIG. 3 shows an example in which the distance L represents a straight distance from the current location of the vehicle 10 to the vehicle maintenance base BS, namely, the straight distance is set as the distance L. FIG. 4 shows another example in which the distance L represents a distance from the current location of the vehicle 10 to the vehicle maintenance base BS along a driving route R, namely, the distance along the driving route R is set as the distance L. It is noted that, in the examples shown in FIGS. 3 and 4, the distance, by which the towing vehicle is to be moved to the current location of the vehicle 10, is not taken into account.

In the example shown in FIG. 3, a distance La from a vehicle A to the vehicle maintenance base BS is about 15 kin, while a distance Lb from a vehicle B to the vehicle maintenance base BS is about 20 km. Where the allowable distance value Lcri as the threshold value is set to about 18 km in the example shown in FIG. 3, it is determined that the vehicle A is not in the long-time requiring state (in which the required time Tre is long) since the distance La is shorter than the allowable distance value Lcri, and that the vehicle B is in the long-time requiring state (in which the required time Tre is long) since the distance Lb is longer than the allowable distance value Leri. Therefore, it is determined that the update of the vehicle control software 92 may be executed in the vehicle A, and the update of the vehicle control software 92 should not be executed in the vehicle B.

Further, as in the example shown in FIG. 4, the distance L is calculated from the driving route R from the current location of the vehicle 10 to the vehicle maintenance base BS, and it is determined whether the vehicle 10 is in the long-time requiring state (in which the required time Tre is long) or not, depending on whether the calculated distance L is longer than the allowable distance value Lcri or not. The distance L dependent on the driving route R is calculated based on the distance along the driving route R, which can be searched as a suitable route to the vehicle maintenance base BS, from, for example, the map information or the like stored in the navigation system 83.

In the example shown in FIG. 4, the distance La from the vehicle A to the vehicle maintenance base BS along a driving route Ra is about 25 km, although a straight distance from the vehicle A to the vehicle maintenance base BS is about 15 km. Meanwhile, a driving route Rb between the vehicle B and the vehicle maintenance base BS is substantially straight, so that the distance Lb from the vehicle B to the vehicle maintenance base BS along the driving route Rb is about 20 km as a straight distance from the vehicle B to the vehicle maintenance base BS. Where the allowable distance value Lcri is set to a value between 20 km and 25 km (e.g., 22 km) in the example shown in FIG. 4, it is determined that the vehicle A is in the long-time requiring state (in which the required time Tre is long) since the distance La is longer than the allowable distance value Lcri, and that the vehicle B is not in the long-time requiring state (in which the required time Tre is long) since the distance Lb is shorter than the allowable distance value Lcri. Therefore, it is determined that the update of the vehicle control software 92 should not be executed in the vehicle A, and the update of the vehicle control software 92 may be executed in the vehicle B.

Further, the software updating portion 122 estimates or calculates the required time Tre required for the repair of the vehicle 10 in case the update of the vehicle control software 92 is not successfully completed, so that the software updating portion 122 may determine whether the vehicle 10 is in the long-time requiring state (in which the required time Tre is long) or not, depending on whether the calculated required time Tre is longer than a predetermined allowable time value Tcri or not. For example, it is possible to determine that the vehicle 10 is in the long-time requiring state (in which the required time Tre is long) when the required time Tre is longer than the allowable time value Tcri, and that the vehicle 10 is not in the long-time requiring state (in which the required time Tre is long) when the required time Tre is not longer than the allowable time value Tcri. The allowable time value Tcri is a predetermined value, which is obtained by experimentation or determined by an appropriate design theory, for example, such that the allowable time value Tcri is set to a threshold value of a length of time that makes the vehicle driver perceive that the convenience for the vehicle driver is largely reduced. Since the allowable time value Tcri varies depending on the vehicle driver, the allowable time value Tcri may be set by each vehicle driver himself or herself in advance.

Further, since whether the vehicle driver perceives the large reduction of the convenience or not is dependent on the time required to move the vehicle 10 to the vehicle maintenance base BS, the required time Tre corresponds to the time required to move the vehicle 10 to the vehicle maintenance base BS for the repair of the vehicle 10, namely, the time required to move the vehicle 10 to the vehicle maintenance base BS is set as the required time Tre. It is noted that, where a work time required for the repair of the vehicle 10 can be estimated, for example, from a history of repair works, the estimated work time may be taken into account.

When the vehicle 10 can run by itself so as to be moved to the vehicle maintenance base BS even in case the update of the vehicle control software 92 is not successfully completed, the software updating portion 122 calculates the required time Tre by dividing the distance L (from the current location of the vehicle 10 to the vehicle maintenance base BS) by the running speed V of the vehicle 10. In this instance, the running speed V can be accurately calculated, by appropriately changing the running speed V depending on the route from the current location to the vehicle maintenance base BS by taking account of condition of road to the vehicle maintenance base BS which can be known from, for example, the map information and the navigation information Inavi stored in the navigation system 83. Further, when the vehicle 10 can run by itself so as to be moved to the vehicle maintenance base BS, but, in a limited condition, for example, with a limitation on the running speed V and/or the gear position being limited to a low-speed gear position, the running speed V is changed as needed. After having calculated the required time Tre, the software updating portion 122 determines that the vehicle 10 is in the long-time requiring state (in which the required time Tre required for the repair of the vehicle 10 is long) when the required time Tre is longer than the allowable time value Tcri, and determines that the vehicle 10 is not in the long-time requiring state (in which the required time Tre required for the repair of the vehicle 10 is long) when the required time Tre is not longer than the allowable time value Tcri When the vehicle 10 is required to be moved to the vehicle maintenance base BS by the towing vehicle in case the update of the vehicle control software 92 is not successfully completed, the software updating portion 122 calculates the required time Tre that corresponds to a sum (T1+T2) of a time T1 and a time T2, wherein the time T1 is a length of time required for the towing vehicle to move to the current location of the vehicle 10, and the time T2 is a length of time required to move the vehicle 10 by the towing vehicle to the vehicle maintenance base BS. In this instance, the time T1 is calculated based on a running speed V1 at which the towing vehicle moves to the current location of the vehicle 10 by its normal running, and the time T2 is calculated based on a running speed V2 at which the towing vehicle moves to the vehicle maintenance base BS while towing the vehicle 10.

Further, there is a case in which the repair of the vehicle 10, which is required in case the update of the vehicle control software 92 is not successfully completed, can be made by a maintenance personnel (engineer) who is sent to the current location of the vehicle 10 so as to repair the vehicle 10 in the current location of the vehicle 10, without having to move the vehicle 10 to the vehicle maintenance base BS. In this case, the required time Tre, which is required for the repair of the vehicle 10, corresponds to a length of time required for the maintenance personnel to arrive in the current location of the vehicle 10, namely, the length of time required for the maintenance personnel to arrive in the current location is set as the required time Tre, so that it is determined whether the vehicle 10 is in the long-time requiring state (in which the required time Tre is long) or not, depending on whether the required time Tre is longer than the predetermined allowable time value Tcri or not. The software updating portion 122 calculates the required time Tre that is the length of time required for the maintenance personnel to arrive in the current location of the vehicle 10, and determines that the vehicle 10 is in the long-time requiring state (in which the required time Tre is long) when the calculated required time Tre is longer than the allowable time value Tcri. Further, it is also possible to determine whether the vehicle 10 is in the long-time requiring state or not, depending on whether a distance L from a current location of the maintenance personnel to the current location of the vehicle 10 is longer than the allowable distance value Lcri or not.

The software updating portion 122 withholds the update of the vehicle control software 92, when determining that the vehicle 10 is in the state in which the need for the update of the vehicle control software 92 is low, the need for the content of the update of the vehicle control software 92 is low, the content of the update of the vehicle control software 92 could influence the running performance of the vehicle 10, and the vehicle 10 is in the long-time requiring state in which the required time Tre is long. On the other hand, the software updating portion 122 executes the update of the vehicle control software 92, when determining that the vehicle 10 is in a software-update requiring state in which the need for the update of the vehicle control software 92 is high, the need for the content of the update of the vehicle control software 92 is high, the content of the update of the vehicle control software 92 could hardly influence the running performance of the vehicle 10, or/and the vehicle 10 is not in the long-time requiring state in which the required time Tre is long.

Figure 5:
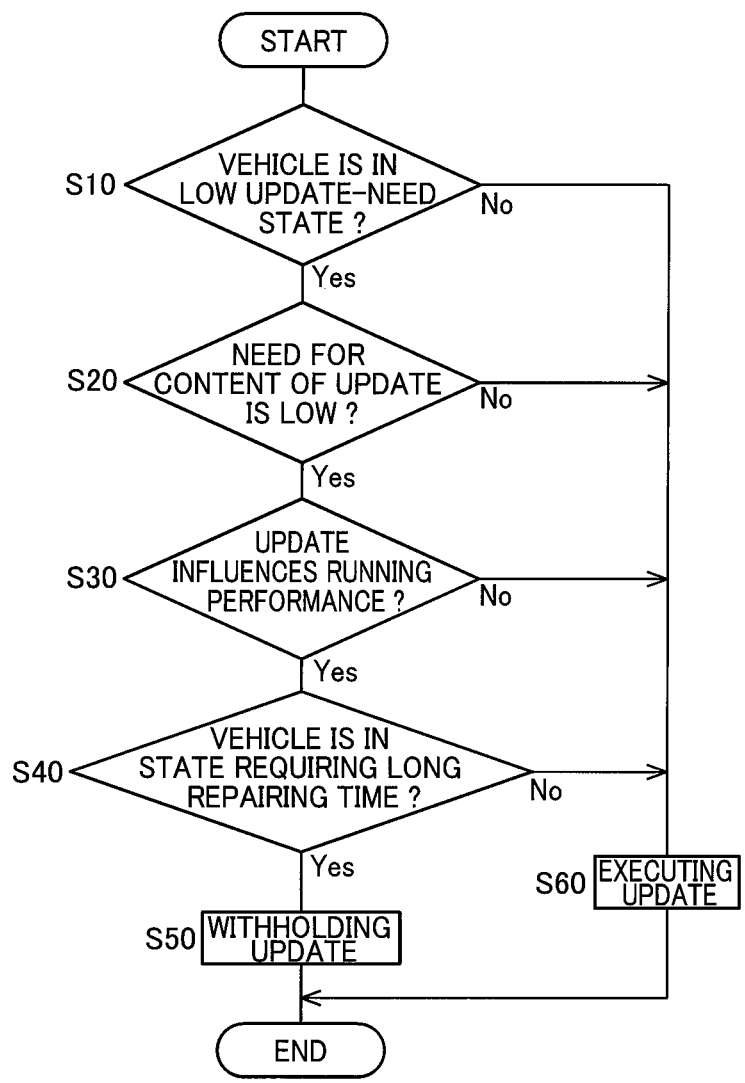
FIG. 5 is a flow chart showing a main part of a control routine that is to be executed by a vehicle control apparatus, when the update of the vehicle control software is to be executed, to determine whether the update is to be executed or withheld, for thereby suppressing reduction of convenience for a vehicle driver in case the update of the software is not successfully completed, without requiring the vehicle driver to make a cumbersome choice as to whether the update of the software is to be executed or withheld.

FIG. 5 is a flow chart showing a main part of a control routine that is to be executed by the vehicle control apparatus 180, when the update of the vehicle control software 92 is to be executed, to determine whether the update is to be executed or withheld, for thereby suppressing reduction of convenience for the vehicle driver in case the update of the software is not successfully completed, without requiring the vehicle driver to make a cumbersome choice as to whether the update of the vehicle control software 92 is to be executed or withheld. This control routine is executed each time when the vehicle control apparatus 180 receives the update software 126 from the external server 200.

As shown in FIG. 5, the control routine is initiated with step S10 corresponding to control function of the software updating portion 122, which is implemented to determine whether the vehicle 10 is in the state in which the need for the update of the vehicle control software 92 is low or not. When a negative determination is made at step S10, the control flow goes to step S60 corresponding to control function of the software updating portion 122, which is implemented to execute the update of the update software 126. When an affirmative determination is made at step S10, step S20 corresponding to control function of the software updating portion 122 is implemented to determine whether the need for the content of the update of the vehicle control software 92 is low or not. When a negative determination is made at step S20, the control flow goes to step S60 that is implemented to execute the update of the update software 126. When an affirmative determination is made at step S20, step S30 corresponding to control function of the software updating portion 122 is implemented to determine whether the content of the update of the vehicle control software 92 could influence the running performance of the vehicle 10 or not. When a negative determination is made at step S30, the control flow goes to step S60 that is implemented to execute the update of the update software 126. When an affirmative determination is made at step S30, step S40 corresponding to control function of the software updating portion 122 is implemented to determine whether the vehicle 10 is in the long-time requiring state (in which the required time Tre is long) or not. When a negative determination is made at step S40, the control flow goes to step S60 that is implemented to execute the update of the update software 126. When an affirmative determination is made at step S40, it is determined that the required time Tre required for the repair of the vehicle 10 is long, and step S50 corresponding to control function of the software updating portion 122 is implemented to withhold the update of the update software 126.

As described above, in the present embodiment, it is determined by the software updating portion 122 whether the vehicle 10 is in the long-time requiring state (in which the required time Tre required for the repair of the vehicle 10 which is needed in case the update of the vehicle control software 92 is not successfully completed is long) or not, such that the update of the vehicle control software 92 is executed when it is determined that the vehicle 10 is not in the long-time requiring state, and such that the update of the vehicle control software 92 is withheld when it is determined that the vehicle 10 is in the long-time requiring state. This control arrangement makes it possible to suppress reduction of the convenience for the vehicle driver in case the update of the vehicle control software 92 is not successfully completed, without making the vehicle driver feel cumbersome.

In the present embodiment, it can be determined whether the vehicle 10 is in the long-time requiring state (in which the required time Tre required for the repair of the vehicle 10 is long) or not, by calculating the required time that is required to move the vehicle 10 to the vehicle maintenance base. Further, it can be determined whether the vehicle 10 is in the long-time requiring state or not, by calculating the distance L from the current location of the vehicle 10 to the vehicle maintenance base BS. Further, it can be determined whether the vehicle 10 is in the long-time requiring state or not, by calculating the required time that is required for the maintenance personnel to arrive in the current location of the vehicle 10. Further, when the vehicle 10 is in the software-update requiring state that requires the update of the vehicle control software 92, the update of the vehicle control software 92 is executed thereby increasing a possibility that the vehicle 10 could be returned to a normal condition and accordingly improving the convenience for the vehicle driver. Further, when the content of the update of the vehicle control software 92 does not influence the running performance of the vehicle 10, the vehicle 10 can continue running even in case the update of the vehicle control software 92 is not successfully completed. In such a case in which the normal running of the vehicle 10 can be made even in case the update of the vehicle control software 92 is not successfully completed, the update of the vehicle control software 92 is executed.

While the preferred embodiment of the present invention has been described in detail by reference to the drawings, it is to be understood that the invention may be otherwise embodied.

For example, in the above-described embodiment, the sequence of implementation of the steps in the control routine shown in the flow chart of FIG. 5 may be changed as needed without deviating from the spirit of the invention. For example, step S40 does not have to be implemented necessarily after steps S10 through S30, but may be implemented before steps S10 through S30 or may be implemented between steps S10 and S20.

In the above-described embodiment, the determination as to whether the update of the update software 126 is to be executed or not is made not only depending on whether the vehicle 10 is in the long-time requiring state (in which the required time Tre is long) or not, but also depending on three factors that are (i) whether the vehicle 10 is in the state in which the need for the update of the vehicle control software 92 is low or not, (ii) whether the need for the content of the update of the vehicle control software 92 is low or not, and (iii) whether the content of the update of the vehicle control software 92 could influence the running performance of the vehicle 10 or not. However, the above-described three factors do not necessarily have to be taken into account, as long as the above-described determination is made at least depending on whether the vehicle 10 is in the long-time requiring state (in which the required time Tre is long) or not, In the above-described embodiment, the time required to move the vehicle 10 to the vehicle maintenance base BS or the time required for the maintenance personnel to arrive in the current location of the vehicle 10, is set as the required time Tre required for the repair of the vehicle 10. However, where the work time actually required for the repair of the vehicle 10 can be estimated, for example, from the history of repair works, the estimated work time may be added to the required time Tre. Further, where a situation of the vehicle maintenance base BS is also can be known, it is possible to take into account of, for example, a wait time for which the vehicle 10 would have to wait until the repair of the vehicle 10 is started in the vehicle maintenance base BS.

In the above-described embodiment, the vehicle 10 is provided with the power transmission apparatus 12 including the continuously-variable transmission portion 18 and the step-variable transmission portion 20 that are connected to each other in series. However, the provision of the power transmission apparatus 12 including the continuously-variable transmission portion 18 and the step-variable transmission portion 20 is not essential. For example, in the vehicle to which the present invention is applied, an engine and a rotating machine may be connected to each other without provision of the differential mechanism 32 or the like therebetween, and a step-variable transmission may be provided between drive wheels and the drive power sources (i.e., the engine and the rotating machine), wherein the step-variable transmission may be replaced with a belt-type continuously-variable transmission.

In the above-described embodiment, the vehicle 10 is a hybrid electric vehicle having the drive power sources in the form of the engine 14 and the second rotating machine MG2. However, the vehicle to which the present invention is applied does not have to be necessarily a hybrid electric vehicle, but may be an engine vehicle or electric vehicle having only one drive power source in the form of the engine 14 or rotating machine, for example. That is, the present invention is not limited to vehicles having certain types of drive power sources and certain types of drive systems, for example.

It is to be understood that the embodiment described above is given for illustrative purpose only, and that the present invention may be embodied with various modifications and improvements which may occur to those skilled in the art.

NOMENCLATURE OF ELEMENTS

10: vehicle
92: vehicle control software
98: first storage portion (storage portion)
112: data receiving portion (receiving portion)
122: software updating portion (updating portion)
126: update software
180: vehicle control apparatus
BS: vehicle maintenance base
L: distance (distance to vehicle maintenance base)
Lcri: allowable distance value
Tre: required time (time required for making repair of vehicle, time required to move vehicle to vehicle maintenance base, time required for maintenance personnel to arrive in current location of vehicle)
Tcri: allowable time value

What is claimed is:

1. A vehicle control apparatus comprising:
a storage portion configured to store therein a vehicle control software for controlling a vehicle;
a receiving portion configured to receive an update software from an external server; and
an updating portion configured to update the vehicle control software stored in the storage portion, to the update software received by the receiving portion,
wherein the updating portion is configured to determine whether the vehicle is in a long-time requiring state that requires a long time for making a repair of the vehicle which is needed in case update of the vehicle control software is not successfully completed, and
wherein the updating portion is configured to execute the update of the vehicle control software when determining that the vehicle is not in the long-time requiring state, and is configured to withhold the update of the vehicle control software when determining that the vehicle is in the long-time requiring state.

2. The vehicle control apparatus according to claim 1, wherein the updating portion is configured to determine whether the vehicle is in the long-time requiring state or not, depending on whether a required time, which is required to move the vehicle to a vehicle maintenance base for making the repair of the vehicle, is longer than a predetermined allowable time value or not, and
wherein the updating portion is configured to determine that the vehicle is in the long-time requiring state, when the required time is longer than the allowable time value.

3. The vehicle control apparatus according to claim 1, wherein the updating portion is configured to determine whether the vehicle is in the long-time requiring state or not, depending on whether a distance from a current location of the vehicle to a vehicle maintenance base for making the repair of the vehicle, is longer than a predetermined allowable distance value or not, and
wherein the updating portion is configured to determine that the vehicle is in the long-time requiring state, when the distance is longer than the allowable distance value.

4. The vehicle control apparatus according to claim 1, wherein the updating portion is configured, when a maintenance personnel is available for making the repair of the vehicle, to determine whether the vehicle is in the long-time requiring state or not, depending on whether a required time, which is required for the maintenance personnel to arrive in a current location of the vehicle, is longer than a predetermined allowable time value or not, and
wherein the updating portion is configured to determine that the vehicle is in the long-time requiring state, when the required time is longer than the allowable time value.

5. The vehicle control apparatus according to claim 1, wherein the updating portion is configured to determine whether the vehicle is in a software-update requiring state that requires the update of the vehicle control software, or not, and
wherein, when determining that the vehicle is in the software-update requiring state, the updating portion is configured to execute the update of the vehicle control software.

6. The vehicle control apparatus according to claim 1, wherein the updating portion is configured to determine whether a content of the update of the vehicle control software influences a running performance of the vehicle, or not, and
wherein, when determining that the content of the update of the vehicle control software does not influence the running performance of the vehicle, the updating portion is configured to execute the update of the vehicle control software.

7. The vehicle control apparatus according to claim 1, wherein the updating portion is configured to determine whether the vehicle is in a software-update requiring state that requires the update of the vehicle control software, or not, and to determine whether a content of the update of the vehicle control software influences a running performance of the vehicle, or not, and wherein the updating portion is configured to execute the update of the vehicle control software, when determining that the vehicle is in the software-update requiring state, and/or that the content of the update of the vehicle control software does not influence the running performance of the vehicle, irrespective of whether determining that the vehicle is in the long-time requiring state or not.

* * * * *